US010003657B2

United States Patent
Yu et al.

(10) Patent No.: US 10,003,657 B2
(45) Date of Patent: Jun. 19, 2018

(54) DATA TRANSMISSION PROCESSING METHOD AND APPARATUS

(71) Applicant: Huawei Technologies Co., Ltd., Shenzhen (CN)

(72) Inventors: Qi Yu, Beijing (CN); Yuan Tao, Shenzhen (CN); Yi Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 15/056,251

(22) Filed: Feb. 29, 2016

(65) Prior Publication Data
US 2016/0182646 A1    Jun. 23, 2016

Related U.S. Application Data

(63) Continuation of application No. PCT/CN2013/082437, filed on Aug. 28, 2013.

(51) Int. Cl.
| | | |
|---|---|---|
| *H04L 29/08* | (2006.01) | |
| *H04W 4/00* | (2018.01) | |
| *H04W 76/00* | (2018.01) | |

(52) U.S. Cl.
CPC .......... *H04L 67/141* (2013.01); *H04W 4/005* (2013.01); *H04W 4/70* (2018.02); *H04W 76/00* (2013.01)

(58) Field of Classification Search
USPC ....... 709/228, 200–204, 224, 223, 229, 218, 709/249
See application file for complete search history.

(56) References Cited

U.S. PATENT DOCUMENTS

| | | | | |
|---|---|---|---|---|
| 7,962,545 B2 * | 6/2011 | Knauerhase | ............ | G06F 9/465 709/203 |
| 2004/0003347 A1 * | 1/2004 | Saidenberg | ............ | G06F 17/24 715/255 |

(Continued)

FOREIGN PATENT DOCUMENTS

| CN | 102368873 A | 3/2012 |
|---|---|---|
| EP | 2437456 A1 | 4/2012 |

OTHER PUBLICATIONS

"OneM2M Functional Architecture," Technical Specification, oneM2M-TS-0001 oneM2M Functional Architecture-V-0.0.6, Aug. 23, 2013, 43 pages.

(Continued)

*Primary Examiner* — Jude Jean Gilles
(74) *Attorney, Agent, or Firm* — Conley Rose, P.C.

(57) ABSTRACT

A data transmission processing method and apparatus, where the method includes receiving, by a common services entity (CSE), a first request message that is sent by an application function (AF) and used to instruct the CSE to update a first underlying network information resource, where the first request message includes data for calling an underlying network service, and the first underlying network information resource is a resource specially used to store the data for calling an underlying network service, updating, by the CSE, original data in the first underlying network information resource to the data for calling an underlying network service, and sending, by the CSE, the data for calling an underlying network service in the first underlying network information resource to an underlying network using a control plane.

30 Claims, 9 Drawing Sheets

(56) References Cited

U.S. PATENT DOCUMENTS

| | | | | |
|---|---|---|---|---|
| 2010/0327054 A1* | 12/2010 | Hammad | ............... | G06F 21/34 |
| | | | | 235/375 |
| 2012/0018506 A1* | 1/2012 | Hammad | ............... | G06F 21/34 |
| | | | | 235/375 |
| 2012/0106462 A1 | 5/2012 | Cao | | |
| 2013/0203394 A1 | 8/2013 | Dong et al. | | |
| 2013/0346504 A1* | 12/2013 | Huang | ................. | H04L 12/185 |
| | | | | 709/204 |
| 2018/0018363 A1* | 1/2018 | Lin | ....................... | H04W 4/70 |

OTHER PUBLICATIONS

Bhalla, R., et al., "CSF Descriptions," oneM2M, XP084003043, Retrieved from the Internet: URL: http://member.onem2m.org/application/documentapp/downloadimmediate/default.aspx?docID=2932, Aug. 7, 2013, 21 pages.

Foreign Communication From a Counterpart Application, European Application No. 13892119.2, Extended European Search Report dated Jul. 11, 2016, 7 pages.

Foreign Communication From a Counterpart Application, PCT Application No. PCT/CN2013/082437, English Translation of International Search Report dated Jun. 4, 2014, 2 pages.

Foreign Communication From a Counterpart Application, PCT Application No. PCT/CN2013/082437, English Translation of Written Opinion dated Jun. 4, 2014, 6 pages.

\* cited by examiner

DATA TRANSMISSION PROCESSING METHOD AND APPARATUS

CROSS-REFERENCE TO RELATED APPLICATION

This application is a continuation of International Application No. PCT/CN2013/082437, filed on Aug. 28, 2013, which is hereby incorporated by reference in its entirety.

TECHNICAL FIELD

Embodiments of the present disclosure relate to communications technologies, and in particular, to a data transmission processing method and apparatus.

BACKGROUND

Machine-to-machine communication (M2M) is a network-based application and service that centers on machine intelligent interaction. The M2M implements data communication without manual intervention by embedding a wireless or wired communication module and application processing logic inside a machine in order to meet informatization requirements of a user in aspects of monitoring, commanding and dispatching, data collection, measurement, and the like.

An overall objective of the one M2M standard organization of M2M is to create an open standard for a business tier of M2M in order to promote establishment of a future network that integrates various devices and services such that M2M services can interoperate, and M2M applications can share fundamental services and be implemented independent of the network.

However, a problem that an M2M device cannot correctly transmit data to an underlying network exists in the prior art.

SUMMARY

Embodiments of the present disclosure provide a data transmission processing method and apparatus, which are used to ensure that an M2M device transmits data for calling an underlying network service to an underlying network using a control plane.

A first aspect of the present disclosure provides a data transmission processing method, including receiving, by a common services entity (CSE), a first request message that is sent by an application function (AF) module and used to instruct the CSE to update a first underlying network information resource, where the first request message includes data for calling an underlying network service, and the first underlying network information resource is a resource specially used to store the data for calling an underlying network service; updating, by the CSE, original data in the first underlying network information resource to the data for calling an underlying network service, and sending, by the CSE, the data for calling an underlying network service in the first underlying network information resource to an underlying network using a control plane.

In a first possible implementation manner of the first aspect, before the receiving, by a CSE, a first request message that is sent by an AF module and used to instruct the CSE to update a first underlying network information resource, the method further includes receiving, by the CSE, a second request message sent by the AF module, where the second request message is used to instruct the CSE to create the first underlying network information resource, and creating, by the CSE, the first underlying network information resource according to the second request message.

With reference to the first aspect or the first possible implementation manner of the first aspect, in a second possible implementation manner of the first aspect, the first underlying network information resource is a newly-defined resource or a newly-defined child resource in a container resource.

With reference to the first aspect or the first or second possible implementation manner of the first aspect, in a third possible implementation manner of the first aspect, the sending, by the CSE, the data for calling an underlying network service in the first underlying network information resource to an underlying network using the control plane includes calling, by the CSE, a network services exposure (NSE) module in the CSE to send the data for calling an underlying network service in the first underlying network information resource to the underlying network using the control plane, or calling, by the CSE, a delivery handling (DH) module in the CSE to forward the data for calling an underlying network service in the first underlying network information resource to an NSE module such that the NSE module sends the data for calling an underlying network service to the underlying network using the control plane.

A second aspect of the present disclosure provides a data transmission processing method, including storing, by an AF module, data for calling an underlying network service into a second underlying network information resource, where the second underlying network information resource is a resource specially used to store the data for calling an underlying network service, and sending, by the AF module to a CSE, a first request message used to instruct the CSE to update a first underlying network information resource, where the first request message includes the data for calling an underlying network service, and the second underlying network information resource is a resource specially used to store the data for calling an underlying network service such that the CSE updates original data in the first underlying network information resource to the data for calling an underlying network service, and sends the data for calling an underlying network service in the first underlying network information resource to an underlying network using a control plane.

In a first possible implementation manner of the second aspect, before the storing, by an AF module, data for calling an underlying network service to a second underlying network information resource, the method further includes creating, by the AF module, the second underlying network information resource, and sending, by the AF module, a second request message to the CSE, where the second request information is used to instruct the CSE to create the first underlying network information resource.

With reference to the second aspect or the first possible implementation manner of the second aspect, in a second possible implementation manner of the second aspect, the first underlying network information resource or the second underlying network information resource includes any one of the following, a newly-defined resource, or a newly-defined child resource in a container resource.

A third aspect of the present disclosure provides a data transmission processing method, including receiving, by a CSE, to-be-sent data and data type information of the to-be-sent data that are sent by an AF module, where the data type information is used to indicate a type of the to-be-sent data, determining, by the CSE according to the data type information, whether the to-be-sent data is data for calling an underlying network service, and if the to-be-sent data is data for calling an underlying network service, sending, by the CSE, the data for calling an underlying network service to an underlying network using a control plane.

In a first possible implementation manner of the third aspect, the sending, by the CSE, the data for calling an underlying network service to an underlying network using a control plane includes calling, by the CSE, a NSE module in the CSE to send the data for calling an underlying network service to the underlying network using the control plane.

According to the third aspect, in a second possible implementation manner of the third aspect, the determining, by the CSE according to the data type information, whether the to-be-sent data is data for calling an underlying network service includes calling, by the CSE, a DH module in the CSE to determine, according to the data type information, whether the to-be-sent data is data for calling an underlying network service, and the sending, by the CSE, the data for calling an underlying network service to an underlying network using a control plane includes calling, by the CSE, the DH module to forward the data for calling an underlying network service to a NSE module in the CSE such that the NSE module sends the data for calling an underlying network service to the underlying network using the control plane.

A fourth aspect of the present disclosure provides a data transmission processing apparatus, including a receiving module configured to receive a first request message that is sent by an AF module and used to instruct a CSE to update a first underlying network information resource, where the first request message includes data for calling an underlying network service, and the first underlying network information resource is a resource specially used to store the data for calling an underlying network service, an updating module configured to update original data in the first underlying network information resource to the data for calling an underlying network service, and a sending module configured to send the data for calling an underlying network service in the first underlying network information resource to an underlying network using a control plane.

In a first possible implementation manner of the fourth aspect, the receiving module is further configured to, before receiving the first request message that is sent by the AF module and used to instruct the CSE to update the first underlying network information resource, receive a second request message sent by the AF module, where the second request message is used to instruct the CSE to create the first underlying network information resource, and the apparatus further includes a creating module configured to create the first underlying network information resource according to the second request message.

With reference to the fourth aspect or the first possible implementation manner of the fourth aspect, in a second possible implementation manner of the fourth aspect, the first underlying network information resource is a newly-defined resource or a newly-defined child resource in a container resource.

With reference to the fourth aspect or the first or second possible implementation manner of the fourth aspect, in a third possible implementation manner of the fourth aspect, the sending module is further configured to call a NSE module in the apparatus to send the data for calling an underlying network service in the first underlying network information resource to the underlying network using the control plane, or call a DH module in the CSE to forward the data for calling an underlying network service in the first underlying network information resource to an NSE module such that the NSE module sends the data for calling an underlying network service to the underlying network using the control plane.

A fifth aspect of the present disclosure provides a data transmission processing apparatus, including a processing module configured to store data for calling an underlying network service into a second underlying network information resource, where the second underlying network information resource is a resource specially used to store the data for calling an underlying network service and a sending module configured to send, to a CSE, a first request message used to instruct the CSE to update a first underlying network information resource, where the first request message includes the data for calling an underlying network service, and the second underlying network information resource is a resource specially used to store the data for calling an underlying network service such that the CSE updates original data in the first underlying network information resource to the data for calling an underlying network service, and sends the data for calling an underlying network service in the first underlying network information resource to an underlying network using a control plane.

In a first possible implementation manner of the fifth aspect, the apparatus further includes a creating module configured to, before storing the data for calling an underlying network service into the second underlying network information resource, create the second underlying network information resource, where the sending module is further configured to send a second request message to the CSE, where the second request information is used to instruct the CSE to create the first underlying network information resource.

With reference to the fifth aspect or the first possible implementation manner of the fifth aspect, in a second possible implementation manner of the fifth aspect, the first underlying network information resource or the second underlying network information resource includes any one of the following a newly-defined resource, or a newly-defined child resource in a container resource.

A sixth aspect of the present disclosure provides a data transmission processing apparatus, including a receiving module configured to receive to-be-sent data and data type information of the to-be-sent data that are sent by an AF module, where the data type information is used to indicate a type of the to-be-sent data, a determining module configured to determine, according to the data type information, whether the to-be-sent data is data for calling an underlying network service, and a sending module configured to, if the determining module determines, according to the data type information, that the to-be-sent data is data for calling an underlying network service, send the data for calling an underlying network service to an underlying network using a control plane.

In a first possible implementation manner of the sixth aspect, the sending module is further configured to call a NSE module in the apparatus to send the data for calling an underlying network service to the underlying network using the control plane.

According to the sixth aspect, in a second possible implementation manner of the sixth aspect, the determining module is further configured to call a DH module in the apparatus to determine, according to the data type information, whether the to-be-sent data is data for calling an underlying network service, and the sending module is further configured to call the DH module to forward the data for calling an underlying network service to a NSE module in the CSE such that the NSE module sends the data for calling an underlying network service to the underlying network using the control plane.

A seventh aspect of the present disclosure provides a data transmission processing apparatus, including a receiver configured to receive a first request message that is sent by an AF module and used to instruct a CSE to update a first underlying network information resource, where the first request message includes data for calling an underlying network service, and the first underlying network information resource is a resource specially used to store the data for calling an underlying network service a processor configured to update original data in the first underlying network information resource to the data for calling an underlying network service, and a transmitter configured to send the data for calling an underlying network service in the first underlying network information resource to an underlying network using a control plane.

In a first possible implementation manner of the seventh aspect, the receiver is further configured to, before receiving the first request message that is sent by the AF module and used to instruct the CSE to update the first underlying network information resource, receive a second request message sent by the AF module, where the second request message is used to instruct the CSE to create the first underlying network information resource, and the processor is further configured to create the first underlying network information resource according to the second request message.

With reference to the seventh aspect or the first possible implementation manner of the seventh aspect, in a second possible implementation manner of the seventh aspect, the first underlying network information resource is a newly-defined resource or a newly-defined child resource in a container resource.

With reference to the seventh aspect or the first or second possible implementation manner of the seventh aspect, in a third possible implementation manner of the seventh aspect, the transmitter is further configured to call a NSE module in the apparatus to send the data for calling an underlying network service in the first underlying network information resource to the underlying network using the control plane, or call a DH module in the CSE to forward the data for calling an underlying network service in the first underlying network information resource to an NSE module such that the NSE module sends the data for calling an underlying network service to the underlying network using the control plane.

An eighth aspect of the present disclosure provides a data transmission processing apparatus, including a processor configured to store data for calling an underlying network service into a second underlying network information resource, where the second underlying network information resource is a resource specially used to store the data for calling an underlying network service, and a transmitter configured to send, to a CSE, a first request message used to instruct the CSE to update a first underlying network information resource, where the first request message includes the data for calling an underlying network service, and the second underlying network information resource is a resource specially used to store the data for calling an underlying network service such that the CSE updates original data in the first underlying network information resource to the data for calling an underlying network service, and sends the data for calling an underlying network service in the first underlying network information resource to an underlying network using a control plane.

In a first possible implementation manner of the eighth aspect, the processor is further configured to, before storing the data for calling an underlying network service into the second underlying network information resource, create the second underlying network information resource, and the transmitter is further configured to send a second request message to the CSE, where the second request information is used to instruct the CSE to create the first underlying network information resource.

With reference to the eighth aspect or the first possible implementation manner of the eighth aspect, in a second possible implementation manner of the eighth aspect, the first underlying network information resource or the second underlying network information resource includes any one of the following: a newly-defined resource, or a newly-defined child resource in a container resource.

A ninth aspect of the present disclosure provides a data transmission processing apparatus, including a receiver configured to receive to-be-sent data and data type information of the to-be-sent data that are sent by an AF module, where the data type information is used to indicate a type of the to-be-sent data, a processor configured to determine, according to the data type information, whether the to-be-sent data is data for calling an underlying network service, and a transmitter configured to, if the processor determines, according to the data type information, that the to-be-sent data is data for calling an underlying network service, send the data for calling an underlying network service to an underlying network using a control plane.

In a first possible implementation manner of the ninth aspect, the transmitter is further configured to call a NSE module in the apparatus to send the data for calling an underlying network service to the underlying network using the control plane.

According to the ninth aspect, in a second possible implementation manner of the ninth aspect, the processor is further configured to call a DH module in the apparatus to determine, according to the data type information, whether the to-be-sent data is data for calling an underlying network service, and the transmitter is further configured to call the DH module to forward the data for calling an underlying network service to a NSE module in the CSE such that the NSE module sends the data for calling an underlying network service to the underlying network using the control plane.

According to the data transmission processing method and apparatus provided in the embodiments, a CSE receives a first request message that is sent by an AF module and used to instruct the CSE to update a first underlying network information resource, where the first request message includes data for calling an underlying network service, and the first underlying network information resource is a resource specially used to store the data for calling an underlying network service, updates original data in the first underlying network information resource to the data for calling an underlying network service, and sends the data for calling an underlying network service in the first underlying network information resource to an underlying network using a control plane, which can ensure that an M2M device transmits the data for calling an underlying network service to the underlying network using the control plane.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

A data transmission processing method of the present disclosure is applicable to an application scenario in which an M2M AF module on an M2M device in an architecture of the one M2M sends data to an underlying network using a CSE.

It should be noted that the data transmission processing method of the present disclosure may be applicable to a scenario in which the AF module in the M2M device transfers to-be-sent data to a CSE located in the same M2M device as the AF module such that the CSE transfers the data to the underlying network according to a type of the to-be-sent data, and may also be applicable to a scenario in which the AF module transfers to-be-sent data to a CSE located in a different M2M device from the AF module such that the CSE transfers the data to the underlying network according to a type of the to-be-sent data.

Figure 1:
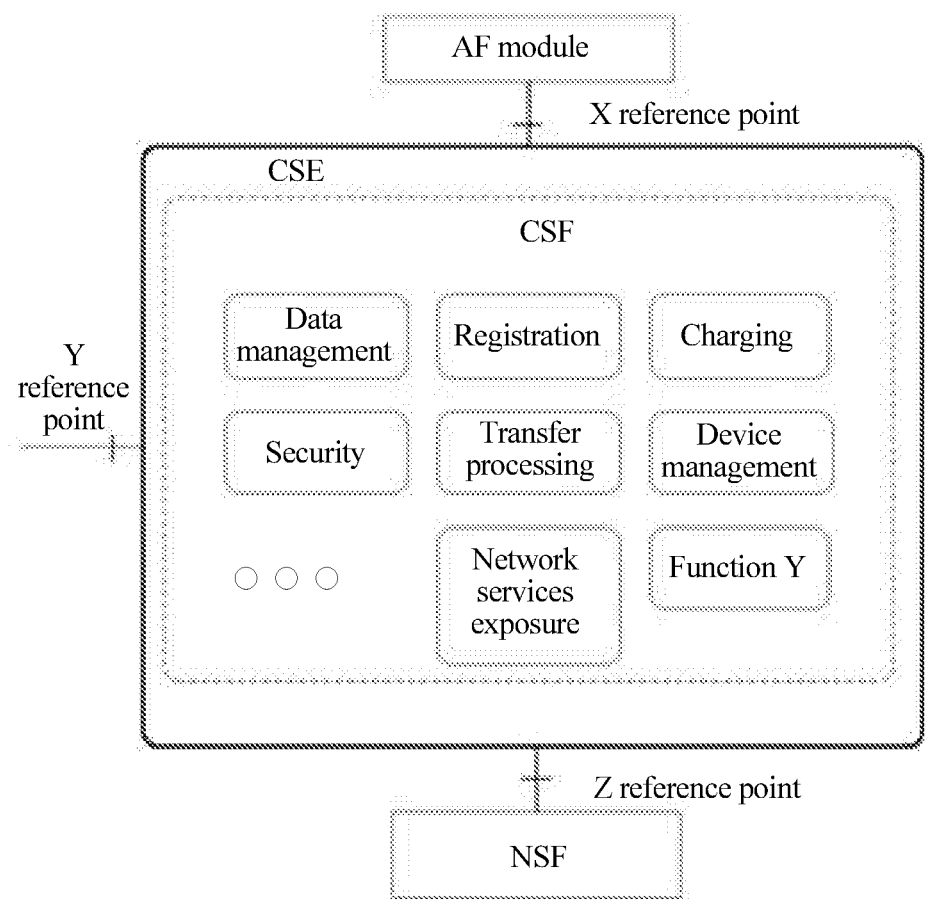
FIG. 1 is a schematic diagram of an M2M system architecture defined by the one M2M.

FIG. 1 is a schematic diagram of an M2M system architecture defined by the one M2M. As shown in FIG. 1, an M2M AF module and an M2M common services function (CSF) module that are on the M2M device communicate using an X reference point, a Y reference point is used to perform communication between CSFs according to the one M2M standard, and a Z reference point is used to perform communication between the CSF and an underlying network service function (NSF). Currently, M2M may be based on a wired manner or a wireless manner, where the wireless manner includes a cellular network and a short distance, and a third generation partnership project (3GPP) cellular network is a widely-used manner.

In the prior art, a CSF includes a data management module, a registration module, a DH module, and a network services exposure (NSE) module, and the like. The DH is responsible for transmitting data (at the X, Y, and Z reference point) among the CSE, the AF, and the NSF, decides which communication path and when the communication path is to be used to transmit the data, and cannot know content of the transmitted data. The NSE is responsible for processing a request from another CSF, transfers the request to the underlying network using the Z reference point, routes a request/response of the underlying network to a corresponding CSF, and shields differences between interfaces of the underlying network.

Figure 2:
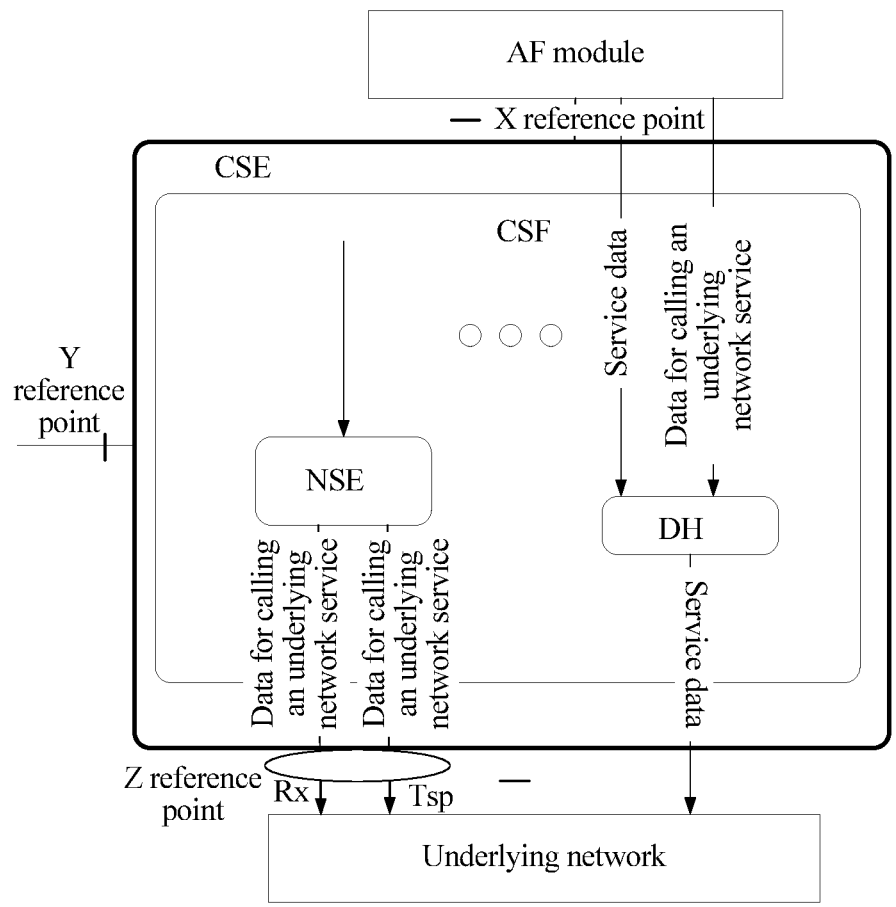
FIG. 2 is a schematic diagram of a data flow direction.

FIG. 2 is a schematic diagram of a data flow direction. As shown in FIG. 2, data flows are classified into an application service data flow and an application service data flow for calling an underlying network service. Application data (service data and data for calling an underlying network service) needs to be transferred to an underlying network using a DH module, and is transmitted as user plane data in the underlying network, the data for calling an underlying network service needs to be transferred to the underlying network through an underlying control plane (Rx, Tsp) interface in order to implement a corresponding function on an M2M device. However, in the prior art, because the DH module cannot known data content, and two types of data are received from an AF module, the DH transmits, using a user plane, data for calling an underlying network service that is received from the AF module and needs to be transmitted using a control plane, which causes that data that needs to be transmitted through the underlying network control plane (Rx, Tsp) interface is transferred using the user plane.

Figure 3:
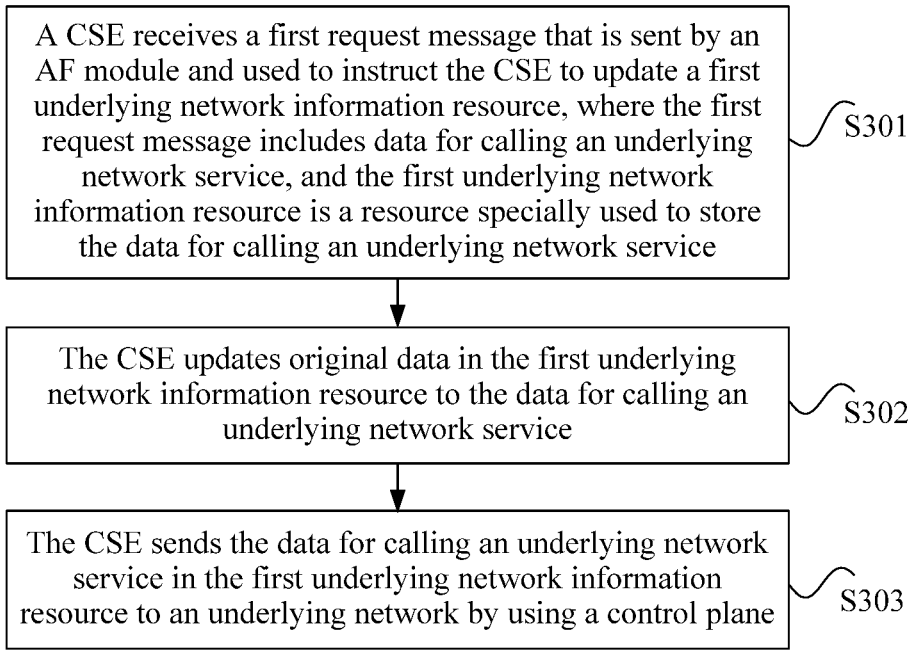
FIG. 3 is a flowchart of Embodiment 1 of a data transmission processing method according to the present disclosure.

FIG. 3 is a flowchart of Embodiment 1 of a data transmission processing method according to the present disclosure. As shown in FIG. 3, in the data transmission processing method of this embodiment, a CSE may create a first underlying network information resource specially used to store data for calling an underlying network service, and then transfer data in the first underlying network information resource to an underlying network using a control plane, and the method includes the following steps.

Step S301: The CSE receives a first request message that is sent by an AF module and used to instruct the CSE to update the first underlying network information resource, where the first request message includes data for calling an underlying network service, and the first underlying network information resource is a resource specially used to store the data for calling an underlying network service.

Further, when the AF module needs to send the data for calling an underlying network service, the AF module stores the data for calling an underlying network service into a second underlying network information resource, and sends, to the CSE, the first request message used to instruct the CSE to update the first underlying network information resource, where the first request message includes the data for calling an underlying network service, and the first underlying network information resource is a resource specially used to store the data for calling an underlying network service.

Optionally, the first underlying network information resource is a newly-defined resource or a newly-defined child resource in a container resource.

Further, the first underlying network information resource may be a newly-defined resource besides an existing resource in a resource tree of the CSE, and may also be a newly-defined child resource in an existing container resource.

Step S302: The CSE updates original data in the first underlying network information resource to the data for calling an underlying network service.

Furthermore, after receiving the first request message, the CSE updates the original data in the first underlying network information resource to the data for calling an underlying network service.

Step S303: The CSE sends the data for calling an underlying network service in the first underlying network information resource to an underlying network using a control plane.

Furthermore, the first underlying network information resource in the resource tree of the CSE is specially used to store the data for calling an underlying network service, therefore, a type of data acquired by the CSE from the first underlying network information resource is data for calling an underlying network service, and the data for calling an underlying network service in the first underlying network information resource is sent to the underlying network using the control plane, which can ensure that an M2M device transmits the data for calling an underlying network service to the underlying network using the control plane.

According to the data transmission processing method provided in this embodiment, a CSE receives a first request message that is sent by an AF module and used to instruct the CSE to update a first underlying network information resource, where the first request message includes data for calling an underlying network service, and the first underlying network information resource is a resource specially used to store the data for calling an underlying network service, updates original data in the first underlying network information resource to the data for calling an underlying network service, and sends the data for calling an underlying network service in the first underlying network information resource to an underlying network using a control plane, which can ensure that an M2M device transmits the data for calling an underlying network service to the underlying network using the control plane.

Further, before step S301, the method may further include receiving, by the CSE, a second request message sent by the AF module, where the second request message is used to instruct the CSE to create the first underlying network information resource, and creating, by the CSE, the first underlying network information resource according to the second request message.

Still further, step S303 may include calling, by the CSE, an NSE module in the CSE to send the data for calling an underlying network service in the first underlying network information resource to the underlying network using the control plane, or calling, by the CSE, a DH module in the CSE to forward the data for calling an underlying network service in the first underlying network information resource to an NSE module such that the NSE module sends the data for calling an underlying network service to the underlying network using the control plane.

According to the data transmission processing method provided in this embodiment, a CSE receives a second request message sent by an AF module, where the second request message is used to instruct the CSE to create a first underlying network information resource, creates the first underlying network information resource according to the second request message, receives a first request message that is sent by the AF module and used to instruct the CSE to update the first underlying network information resource, where the first request message includes data for calling an underlying network service, and the first underlying network information resource is a resource specially used to store the data for calling an underlying network service, updates original data in the first underlying network information resource to the data for calling an underlying network service, and sends the data for calling an underlying network service in the first underlying network information resource to an underlying network using a control plane, which can ensure that an M2M device transmits the data for calling an underlying network service to the underlying network using the control plane.

Figure 4:
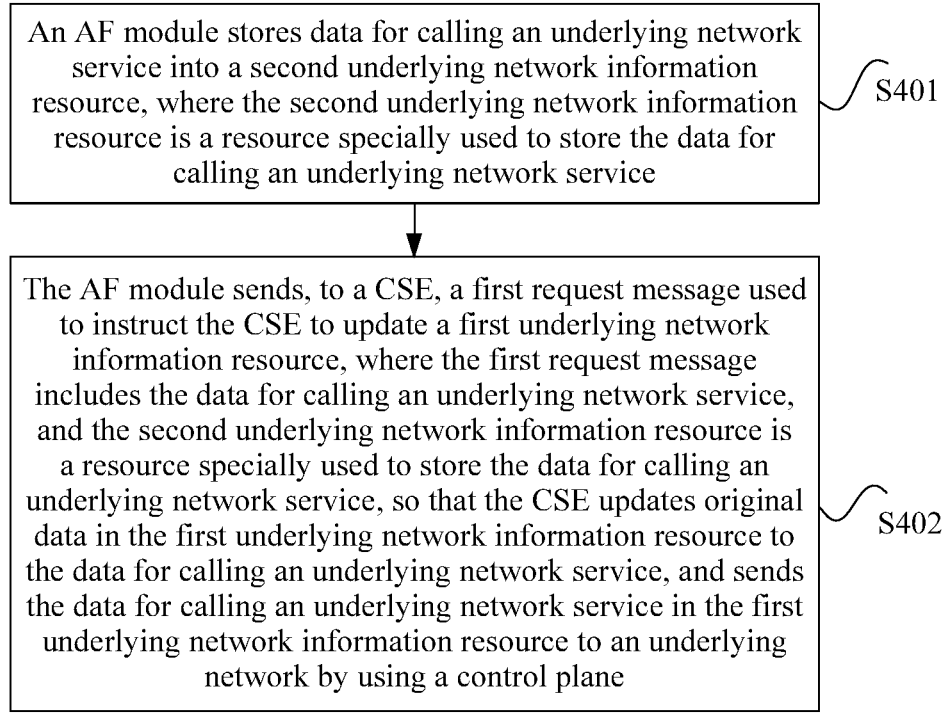
FIG. 4 is a flowchart of Embodiment 2 of a data transmission processing method according to the present disclosure.

FIG. 4 is a flowchart of Embodiment 2 of a data transmission processing method according to the present disclosure. As shown in FIG. 4, in the data transmission processing method of this embodiment, an AF module creates a second underlying network information resource specially used to store data for calling an underlying network service, and sends the data for calling an underlying network service in the second underlying network information resource to a CSE such that the CSE updates a first underlying network information resource, and the method includes the following steps.

Step S401: The AF module stores the data for calling an underlying network service into the second underlying network information resource, where the second underlying network information resource is a resource specially used to store the data for calling an underlying network service.

Further, when the AF module needs to send the data for calling an underlying network service, the AF module stores the data for calling an underlying network service into the second underlying network information resource, and sends, to the CSE, a first request message used to instruct the CSE to update the first underlying network information resource, where the first request message includes the data for calling an underlying network service, and the first underlying network information resource is a resource specially used to store the data for calling an underlying network service.

Step S402: The AF module sends, to the CSE, a first request message used to instruct the CSE to update a first underlying network information resource, where the first request message includes the data for calling an underlying network service, and the second underlying network information resource is a resource specially used to store the data for calling an underlying network service such that the CSE updates original data in the first underlying network information resource to the data for calling an underlying network service, and sends the data for calling an underlying network service in the first underlying network information resource to an underlying network using a control plane.

Optionally, the first underlying network information resource or the second underlying network information resource includes any one of the following: a newly-defined resource, or a newly-defined child resource in a container resource.

Further, the first underlying network information resource and the second underlying network information resource may be newly-defined resources besides an existing resource in a resource tree of the CSE, and may also be newly-defined child resources in an existing container resource.

According to the data transmission processing method provided in this embodiment, an AF module stores data for calling an underlying network service into a second underlying network information resource, where the second underlying network information resource is a resource specially used to store the data for calling an underlying network service, and then sends, to the CSE, a first request message used to instruct the CSE to update a first underlying network information resource, where the first request message includes the data for calling an underlying network service, and the second underlying network information resource is a resource specially used to store the data for calling an underlying network service such that the CSE updates original data in the first underlying network information resource to the data for calling an underlying network service, and sends the data for calling an underlying network service in the first underlying network information resource to an underlying network using a control plane, which can ensure that an M2M device transmits the data for calling an underlying network service to the underlying network using the control plane.

Further, before step S401, the method further includes creating, by the AF module, the second underlying network information resource; and sending, by the AF module, a second request message to the CSE, where the second request information is used to instruct the CSE to create the first underlying network information resource.

Figure 5:
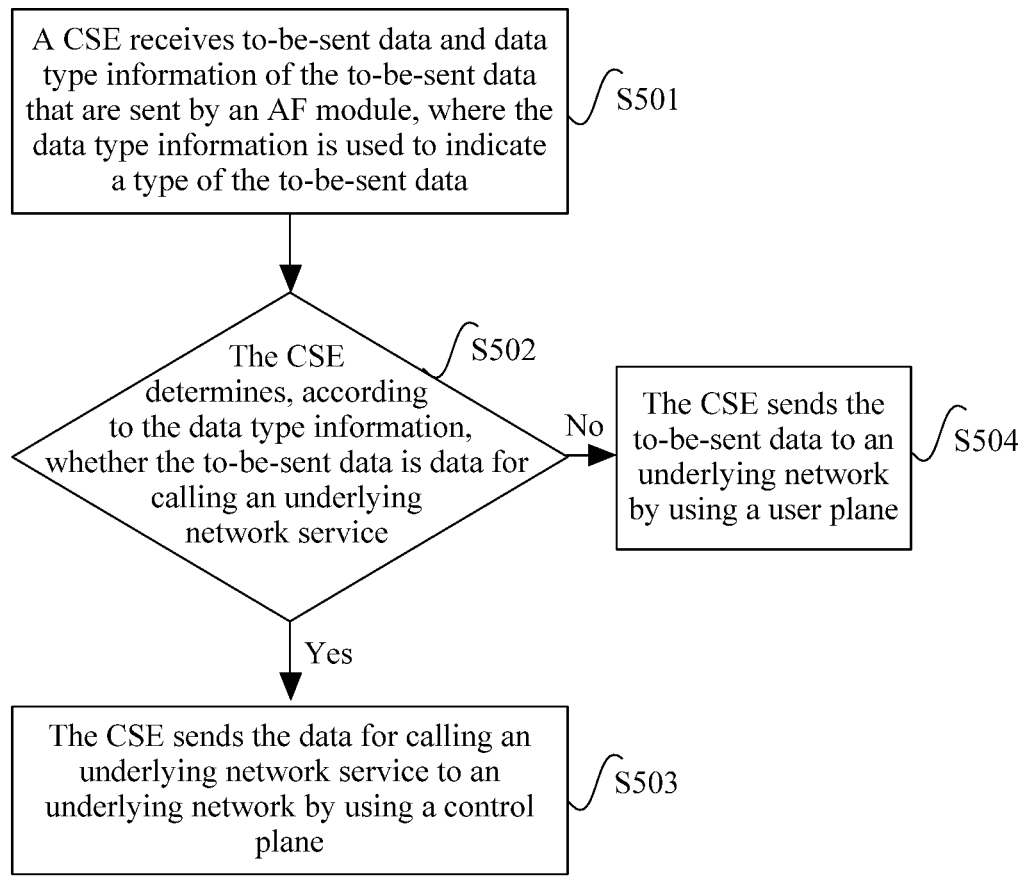
FIG. 5 is a flowchart of Embodiment 3 of a data transmission processing method according to the present disclosure.

FIG. 5 is a flowchart of Embodiment 3 of a data transmission processing method according to the present disclosure. As shown in FIG. 5, a difference between the data transmission processing method in this embodiment and that in the embodiment shown in FIG. 1 lies in that, in the data transmission processing method in this embodiment, an AF module indicates a data type during data transmission such that a CSE sends to-be-sent data to an underlying network according to the data type, and the method includes the following steps.

Step S501: The CSE receives to-be-sent data and data type information of the to-be-sent data that are sent by the AF module, where the data type information is used to indicate a type of the to-be-sent data.

Step S502: The CSE determines, according to the data type information, whether the to-be-sent data is data for calling an underlying network service, if the to-be-sent data is data for calling an underlying network service, performs step S503, and if the to-be-sent data is not data for calling an underlying network service, performs step S504.

Step S503: The CSE sends the data for calling an underlying network service to an underlying network using a control plane.

Step S504: The CSE sends the to-be-sent data to an underlying network using a user plane.

According to the data transmission processing method provided in this embodiment, a CSE receives to-be-sent data and data type information of the to-be-sent data that are sent by an AF module, where the data type information is used to indicate a type of the to-be-sent data, determines, according to the data type information, whether the to-be-sent data is data for calling an underlying network service, if the to-be-sent data is data for calling an underlying network service, sends the data for calling an underlying network service to an underlying network using a control plane, which can ensure that an M2M device transmits the data for calling an underlying network service to the underlying network using the control plane.

Step S503 may further include calling, by the CSE, an NSE module in the CSE to send the data for calling an underlying network service to the underlying network using the control plane.

Step S502 may further include calling, by the CSE, a DH module in the CSE to determine, according to the data type information, whether the to-be-sent data is data for calling an underlying network service.

Step S503 may further include calling, by the CSE, the DH module to forward the data for calling an underlying network service to the NSE module in the CSE such that the NSE module sends the data for calling an underlying network service to the underlying network using the control plane.

The following gives, using a process of interaction between the AF module and the CSE, a detailed description of the data transmission processing method provided in the present disclosure.

Figure 6:
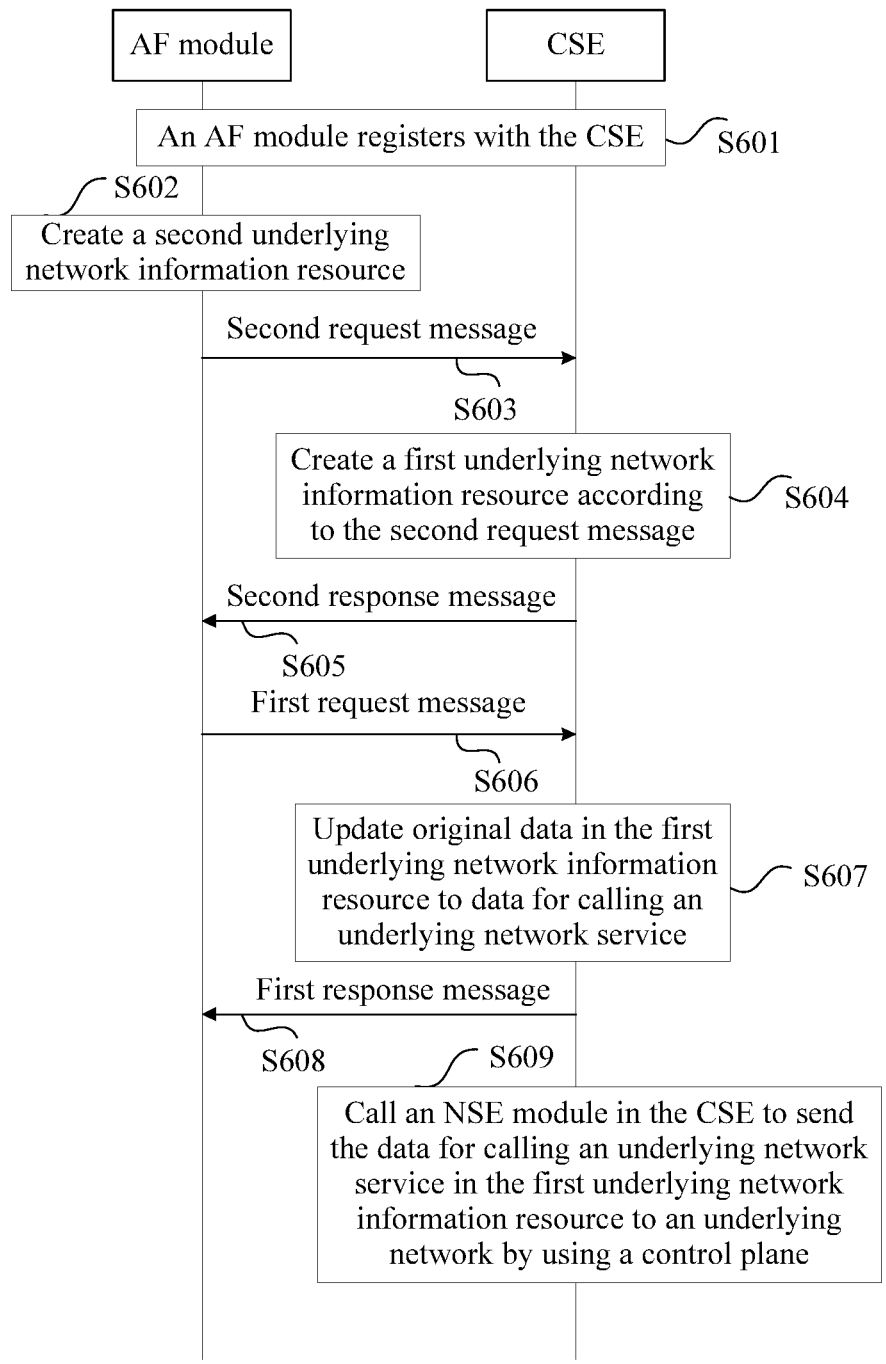
FIG. 6 is a flowchart of Embodiment 4 of a data transmission processing method according to the present disclosure.

FIG. 6 is a flowchart of Embodiment 4 of a data transmission processing method according to the present disclosure. As shown in FIG. 6, in the data transmission processing method of this embodiment, a CSE may create a first underlying network information resource specially used to store data for calling an underlying network service, and then transfer data in the first underlying network information resource to an underlying network using a control plane, and the method includes the following steps.

Step S601: An AF module registers with the CSE.

Furthermore, a process in which the AF module registers with the CSE is the prior art, and details are not described herein again.

Step S602: The AF module creates a second underlying network information resource.

Figure 7A:
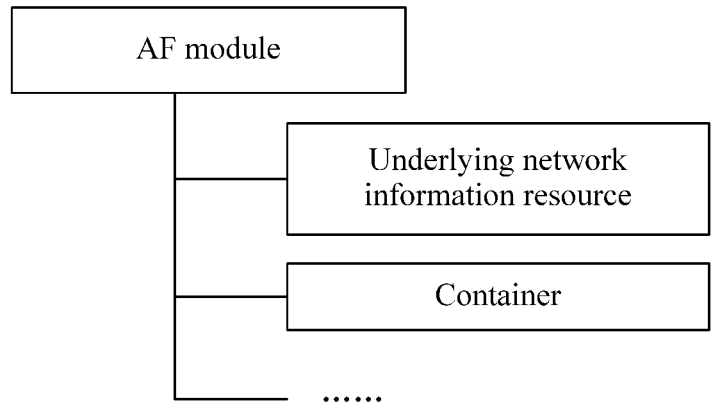
FIG. 7A is a schematic diagram of a resource tree of an AF module in Embodiment 4 of a data transmission processing method according to the present disclosure.

FIG. 7A is a schematic diagram of a resource tree of the AF module in Embodiment 4 of the data transmission processing method according to the present disclosure. As shown in FIG. 7A, the second underlying network information resource created by the AF module may be a newly-defined resource underlying network information resource added in an existing resource tree.

Figure 7B:
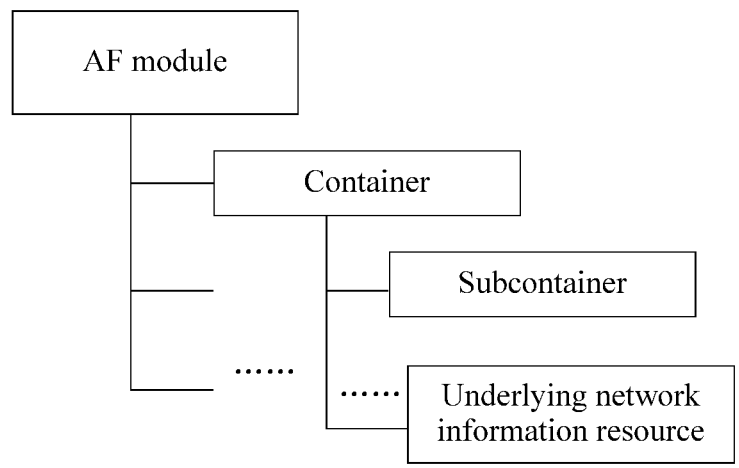
FIG. 7B is a schematic diagram of another resource tree of an AF module in Embodiment 4 of a data transmission processing method according to the present disclosure.

FIG. 7B is a schematic diagram of another resource tree of the AF module in Embodiment 4 of the data transmission processing method according to the present disclosure. As shown in FIG. 7B, the second underlying network information resource created by the AF module may also a newly-defined child resource in an existing container resource, where the child resource is used as the underlying network information resource.

It may be understood that, the second underlying network information resource may also be a newly-defined child resource in another resource besides the container resource in an existing resource.

Step S603: The AF module sends, to the CSE, a second request message used to instruct the CSE to create the first underlying network information resource.

Step S604: The CSE creates the first underlying network information resource according to the second request message.

Furthermore, the CSE performs local processing to create an underlying network information resource, where the first underlying network information resource is a resource specially used to store the data for calling an underlying network service. A schematic diagram of a resource tree in this embodiment may be similar to the schematic diagrams of the resource trees shown in FIG. 7A and FIG. 7B, and the first underlying network information resource may be a newly-defined resource added in the existing resource tree, and may also be a newly-defined child resource in the existing container resource.

It may be understood that, the first underlying network information resource may also be a newly-defined child resource in another resource besides the container resource in the existing resource.

Step S605: The CSE sends, to the AF module, a second response message used to indicate whether the CSE has successfully created the first underlying network information resource.

If the second response message indicates that the CSE has successfully created the first underlying network information resource, step S606 is performed.

Step S606: The AF module sends, to the CSE, a first request message used to instruct the CSE to update the first underlying network information resource, where the first request message includes the data for calling an underlying network service.

Step S607: The CSE updates original data in the first underlying network information resource to the data for calling an underlying network service.

Step S608: The CSE sends, to the AF module, a first response message used to indicate whether the CSE has successfully updated the first underlying network information resource.

Furthermore, if the first response message indicates that the CSE has successfully updated the first underlying network information resource, step S609 is performed.

Step S609: The CSE calls an NSE module in the CSE to send the data for calling an underlying network service in the first underlying network information resource to the underlying network using the control plane.

Furthermore, the NSE may take out the data for calling an underlying network service from the underlying network information resource, and after determining whether the data for calling an underlying network service in the underlying network information resource is to be transmitted through an Rx interface or through a Tsp interface, transfers the data for calling an underlying network service to the underlying network through the Rx interface or the Tsp interface.

In another implementation manner of the present disclosure, step S609 may be the following.

The CSE calls a DH module in the CSE to forward the data for calling an underlying network service in the first underlying network information resource to an NSE module such that the NSE module sends the data for calling an underlying network service to the underlying network using the control plane.

It should be noted that, if the AFA module and the CSE have created the underlying network information resource, step S601 to step S605 may be skipped.

According to the data transmission processing method provided in this embodiment, a CSE receives a second request message sent by an AF module, where the second request message is used to instruct the CSE to create a first underlying network information resource, creates the first underlying network information resource according to the second request message, receives a first request message that is sent by the AF module and used to instruct the CSE to update the first underlying network information resource, where the first request message includes data for calling an underlying network service, and the first underlying network information resource is a resource specially used to store the data for calling an underlying network service, updates original data in the first underlying network information resource to the data for calling an underlying network service, and sends the data for calling an underlying network service in the first underlying network information resource to an underlying network using a control plane, which can ensure that an M2M device transmits the data for calling an underlying network service to the underlying network using the control plane.

Figure 8:
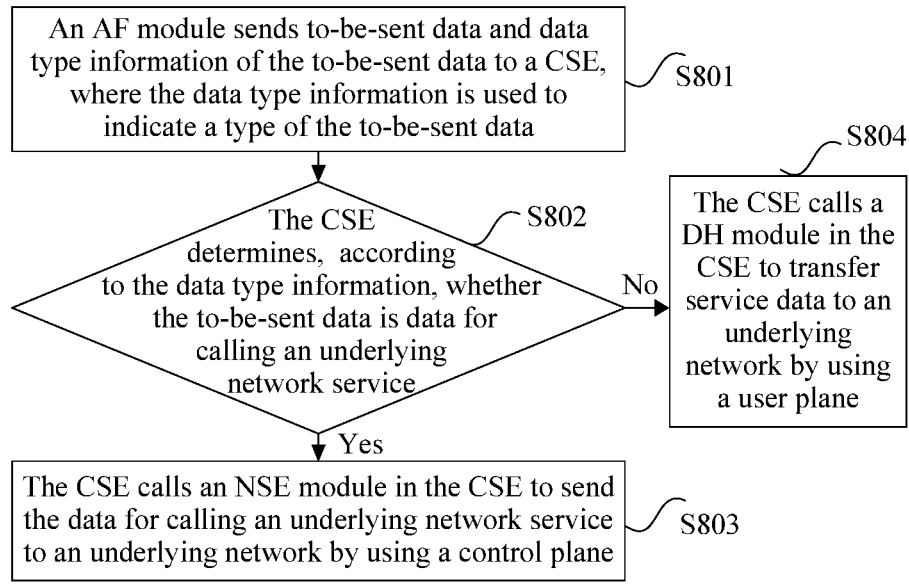
FIG. 8 is a flowchart of Embodiment 5 of a data transmission processing method according to the present disclosure.

FIG. 8 is a flowchart of Embodiment 5 of a data transmission processing method according to the present disclosure. As shown in FIG. 8, in the data transmission method of this embodiment, an AF module indicates a data type during data transmission such that the CSE sends to-be-sent data to an underlying network according to the data type, and the method may include the following steps.

Step S801: The AF module sends to-be-sent data and data type information of the to-be-sent data to the CSE, where the data type information is used to indicate a type of the to-be-sent data.

Step S802: The CSE determines, according to the data type information, whether the to-be-sent data is data for calling an underlying network service, if the to-be-sent data is data for calling an underlying network service, performs step S803, and if the to-be-sent data is not data for calling an underlying network service, performs step S804.

Step S803: The CSE calls an NSE module in the CSE to send the data for calling an underlying network service to the underlying network using a control plane.

Step S804: The CSE calls a DH module in the CSE to transfer service data to an underlying network using a user plane.

According to the data transmission processing method provided in this embodiment, a CSE receives to-be-sent data and data type information of the to-be-sent data that are sent by an AF module, where the data type information is used to indicate a type of the to-be-sent data, determines, according to the data type information, whether the to-be-sent data is data for calling an underlying network service; if the to-be-sent data is data for calling an underlying network service, sends the data for calling an underlying network service to an underlying network using a control plane, which can ensure that an M2M device transmits the data for calling an underlying network service to the underlying network using the control plane.

Figure 9:
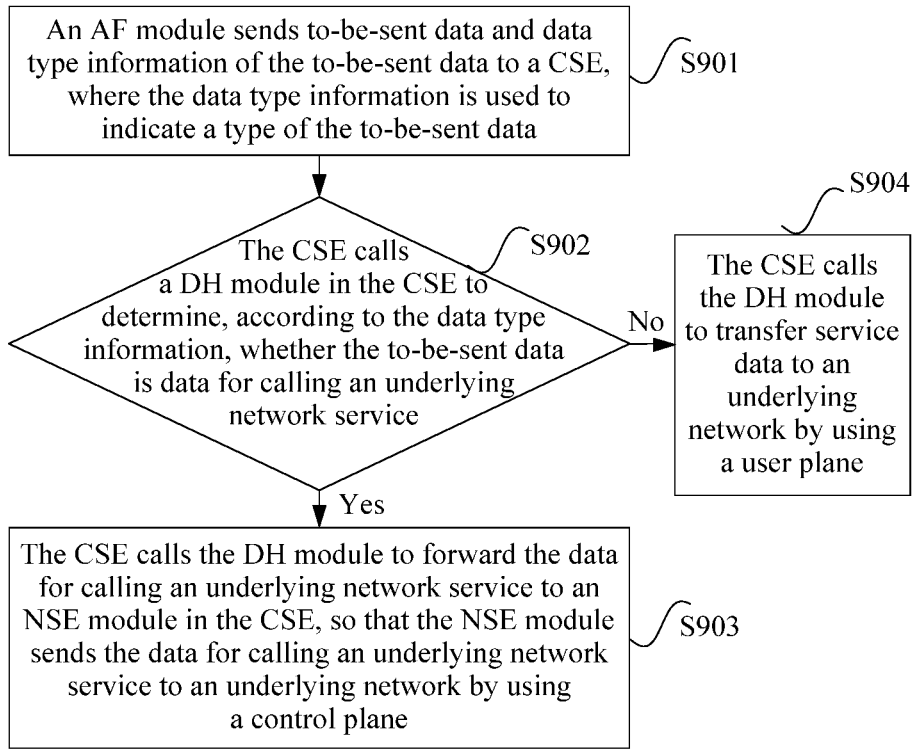
FIG. 9 is a flowchart of Embodiment 6 of a data transmission processing method according to the present disclosure.

FIG. 9 is a flowchart of Embodiment 6 of a data transmission processing method according to the present disclosure. As shown in FIG. 9, in the data transmission method of this embodiment, an AF module indicates a data type during data transmission such that the CSE calls a DH module in the CSE to determine whether to-be-sent data is data for calling an underlying network service, and then sends the to-be-sent data to an underlying network, and the method may include the following steps.

Step S901: The AF module sends to-be-sent data and data type information of the to-be-sent data to the CSE, where the data type information is used to indicate a type of the to-be-sent data.

Step S902: The CSE calls the DH module in the CSE to determine, according to the data type information, whether the to-be-sent data is data for calling an underlying network service; if the to-be-sent data is data for calling an underlying network service, performs step S903, and if the to-be-sent data is not data for calling an underlying network service, performs step S904.

Step S903: The CSE calls the DH module to forward the data for calling an underlying network service to an NSE module in the CSE such that the NSE module sends the data for calling an underlying network service to the underlying network using a control plane.

Step S904: The CSE calls the DH module to transfer service data to an underlying network using a user plane.

According to the data transmission processing method provided in this embodiment, a CSE receives to-be-sent data and data type information of the to-be-sent data that are sent by an AF module, where the data type information is used to indicate a type of the to-be-sent data, determines, according to the data type information, whether the to-be-sent data is data for calling an underlying network service, if the to-be-sent data is data for calling an underlying network service, sends the data for calling an underlying network service to an underlying network using a control plane, which can ensure that an M2M device transmits the data for calling an underlying network service to the underlying network using the control plane.

Figure 10:
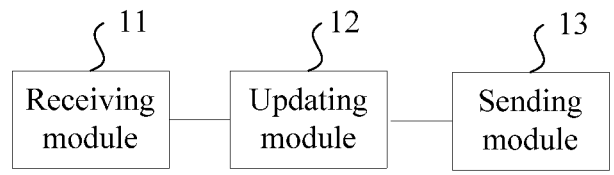
FIG. 10 is a schematic structural diagram of Embodiment 1 of a data transmission processing apparatus according to the present disclosure.

FIG. 10 is a schematic structural diagram of Embodiment 1 of a data transmission processing apparatus according to the present disclosure. As shown in FIG. 10, the data transmission apparatus of this embodiment includes a receiving module 11, an updating module 12, and a sending module 13, where the receiving module 11 is configured to receive a first request message that is sent by an AF module and used to instruct a CSE to update a first underlying network information resource, where the first request message includes data for calling an underlying network service, and the first underlying network information resource is a resource specially used to store the data for calling an underlying network service. The updating module 12 is configured to update original data in the first underlying network information resource to the data for calling an underlying network service, and the sending module 13 is configured to send the data for calling an underlying network service in the first underlying network information resource to an underlying network using a control plane.

The apparatus in this embodiment may be used to implement the technical solutions in the method embodiment shown in FIG. 3, and implementation principles and technical effects of the apparatus are similar to those in the method embodiment and are not described herein again.

Figure 11:
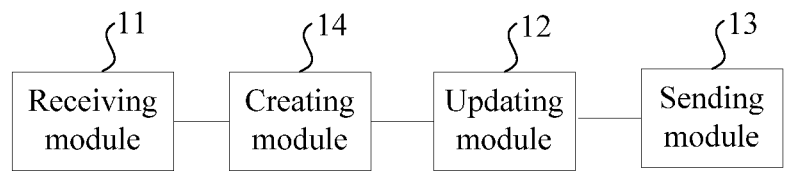
FIG. 11 is a schematic structural diagram of Embodiment 2 of a data transmission processing apparatus according to the present disclosure.

FIG. 11 is a schematic structural diagram of Embodiment 2 of a data transmission processing apparatus according to the present disclosure. As shown in FIG. 11, on the basis of the embodiment shown in FIG. 10, the data transmission apparatus of this embodiment further includes a creating module 14, where the receiving module 11 is further configured to, before receiving the first request message that is sent by the AF module and used to instruct the CSE to update the first underlying network information resource, receive a second request message sent by the AF module, where the second request message is used to instruct the CSE to create the first underlying network information resource.

The creating module 14 is configured to create the first underlying network information resource according to the second request message.

Optionally, the first underlying network information resource includes a newly-defined resource or a newly-defined child resource in a container resource.

The sending module 13 is further configured to call an NSE module in the apparatus to send the data for calling an underlying network service in the first underlying network information resource to the underlying network using the control plane, or call a DH module in the apparatus to forward the data for calling an underlying network service in the first underlying network information resource to an NSE module such that the NSE module sends the data for calling an underlying network service to the underlying network using the control plane.

The apparatus in this embodiment may be used to implement the technical solutions in the method embodiment shown in FIG. 3 or FIG. 6, and implementation principles and technical effects of the apparatus are similar to those in the method embodiment and are not described herein again.

Figure 12:
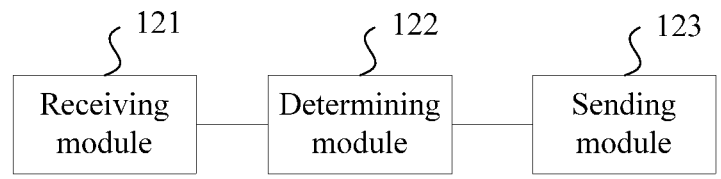
FIG. 12 is a schematic structural diagram of Embodiment 3 of a data transmission processing apparatus according to the present disclosure.

FIG. 12 is a schematic structural diagram of Embodiment 3 of a data transmission processing apparatus according to the present disclosure. As shown in FIG. 12, the data transmission apparatus of this embodiment includes a receiving module 121, a determining module 122, and a sending module 123, where the receiving module 121 is configured to receive to-be-sent data and data type information of the to-be-sent data that are sent by an AF module, where the data type information is used to indicate a type of the to-be-sent data. The determining module 122 is configured to determine, according to the data type information, whether the to-be-sent data is data for calling an underlying network service, and the sending module 123 is configured to, if the determining module determines, according to the data type information, that the to-be-sent data is data for calling an underlying network service, send the data for calling an underlying network service to an underlying network using a control plane.

The apparatus in this embodiment may be used to implement the technical solutions in the method embodiment shown in FIG. 4, and implementation principles and technical effects of the apparatus are similar to those in the method embodiment and are not described herein again.

The sending module 123 is further configured to call an NSE module in the apparatus to send the data for calling an underlying network service to the underlying network using the control plane.

Further, data information includes the to-be-sent data and the data type information of the to-be-sent data.

The determining module 122 is further configured to call a DH module in the apparatus to determine, according to the data type information, whether the to-be-sent data is data for calling an underlying network service.

The sending unit 123 is further configured to call the DH module to forward the data for calling an underlying network service to the NSE module in the CSE such that the NSE module sends the data for calling an underlying network service to the underlying network using the control plane.

The apparatus in this embodiment may be used to implement the technical solutions in the method embodiment shown in FIG. 4, FIG. 8, or FIG. 9, and implementation principles and technical effects of the apparatus are similar to those in the method embodiment and are not described herein again.

Figure 13:
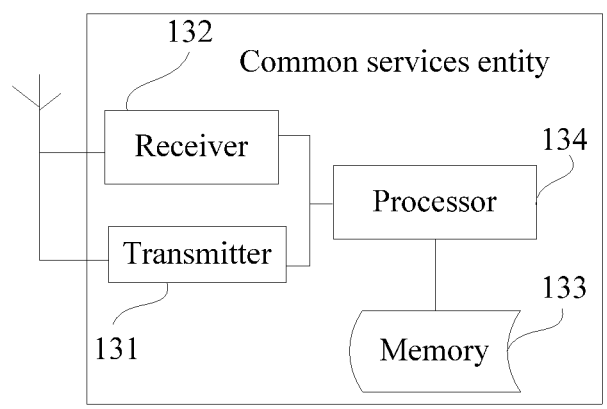
FIG. 13 is a schematic structural diagram of Embodiment 4 of a data transmission processing apparatus according to the present disclosure.

FIG. 13 is a schematic structural diagram of Embodiment 4 of a data transmission processing apparatus according to the present disclosure. As shown in FIG. 13, the data transmission apparatus of this embodiment may be a common services entity, including a transmitter 131, a receiver 132, a memory 133, and a processor 134 that is separately connected to the transmitter 131, the receiver 132, and the memory 133. Certainly, the common services entity may further include generic components, such as an antenna, a baseband processing component, an intermediate radio frequency processing component, and an input/output apparatus. This embodiment of the present disclosure sets no limitation thereto.

The memory 133 stores a group of program code, and the processor 134 is configured to call the program code stored in the memory 133 in order to perform the following operations receiving a first request message that is sent by an AF module and used to instruct a CSE to update a first underlying network information resource, where the first request message includes data for calling an underlying network service, and the first underlying network information resource is a resource specially used to store the data for calling an underlying network service, updating original data in the first underlying network information resource to the data for calling an underlying network service, and sending the data for calling an underlying network service in the first underlying network information resource to an underlying network using a control plane, or receiving to-be-sent data and data type information of the to-be-sent data that are sent by an AF module, where the data type information is used to indicate a type of the to-be-sent data; determining, according to the data type information, whether the to-be-sent data is data for calling an underlying network service, and if the to-be-sent data is data for calling an underlying network service, sending the data for calling an underlying network service to an underlying network using a control plane.

The apparatus in this embodiment may be used to implement the technical solutions in the method embodiment shown in FIG. 3, FIG. 4, FIG. 6, FIG. 8, or FIG. 9, and implementation principles and technical effects of the apparatus are similar to those of the method embodiment and are not described herein again.

Figure 14:
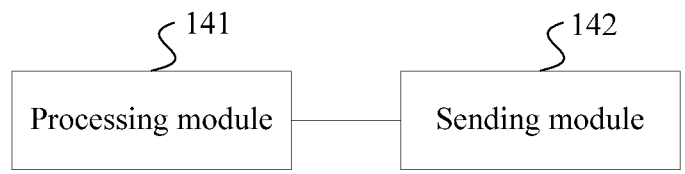
FIG. 14 is a schematic structural diagram of Embodiment 5 of a data transmission processing apparatus according to the present disclosure.

FIG. 14 is a schematic structural diagram of Embodiment 5 of a data transmission processing apparatus according to the present disclosure. As shown in FIG. 14, the data transmission apparatus of this embodiment includes a processing module 141 and a sending module 142, where the processing module 141 is configured to store data for calling an underlying network service into a second underlying network information resource, where the second underlying network information resource is a resource specially used to store the data for calling an underlying network service. The sending module 142 is configured to send, to a CSE, a first request message used to instruct the CSE to update a first underlying network information resource, where the first request message includes the data for calling an underlying network service, and the second underlying network information resource is a resource specially used to store the data for calling an underlying network service such that the CSE updates original data in the first underlying network information resource to the data for calling an underlying network service, and sends the data for calling an underlying network service in the first underlying network information resource to an underlying network using a control plane.

The apparatus in this embodiment may be used to implement the technical solutions in the method embodiment shown in FIG. 5, and implementation principles and technical effects of the apparatus are similar to those in the method embodiment and are not described herein again.

Figure 15:
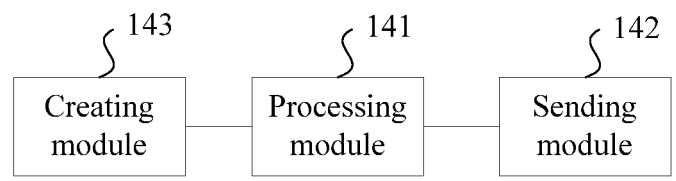
FIG. 15 is a schematic structural diagram of Embodiment 6 of a data transmission processing apparatus according to the present disclosure.

FIG. 15 is a schematic structural diagram of Embodiment 6 of a data transmission processing apparatus according to the present disclosure. As shown in FIG. 15, on the basis of the embodiment of FIG. 14, the data transmission apparatus of this embodiment further includes a creating module 143, where the creating module 143 is configured to, before storing the data for calling an underlying network service into the second underlying network information resource, create the second underlying network information resource.

The sending module 142 is further configured to send a second request message to the CSE, where the second request information is used to instruct the CSE to create the first underlying network information resource.

Optionally, the first underlying network information resource or the second underlying network information resource includes any one of the following: a newly-defined resource, or a newly-defined child resource in a container resource.

The apparatus in this embodiment may be used to implement the technical solutions in the method embodiment shown in FIG. 5, FIG. 8, or FIG. 9, and implementation principles and technical effects of the apparatus are similar to those in the method embodiment and are not described herein again.

Figure 16:
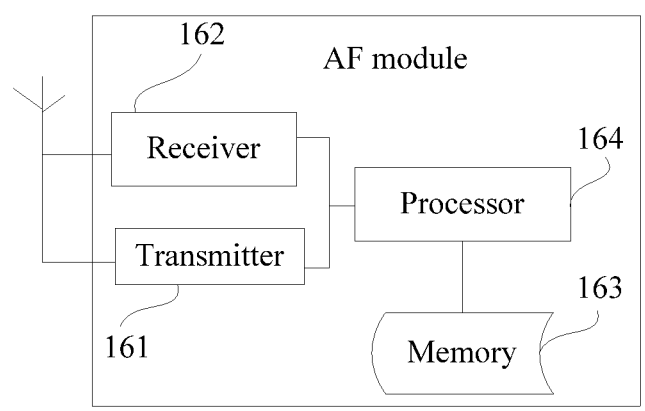
FIG. 16 is a schematic structural diagram of Embodiment 7 of a data transmission processing apparatus according to the present disclosure.

FIG. 16 is a schematic structural diagram of Embodiment 7 of a data transmission processing apparatus according to the present disclosure. As shown in FIG. 16, the data transmission apparatus of this embodiment may be an AF module, including a transmitter 161, a receiver 162, a memory 163, and a processor 164 that is separately connected to the transmitter 161, the receiver 162, and the memory 163. Certainly, the AF module may further include generic components, such as an antenna, a baseband processing component, an intermediate radio frequency processing component, and an input/output apparatus. This embodiment of the present disclosure sets no limitation thereto.

The memory 163 stores a group of program code, and the processor 164 is configured to call the program code stored in the memory 163 in order to perform the following operations: storing data for calling an underlying network service into a second underlying network information resource, where the second underlying network information resource is a resource specially used to store the data for calling an underlying network service, and sending, to a CSE, a first request message used to instruct the CSE to update a first underlying network information resource, where the first request message includes the data for calling an underlying network service, and the second underlying network information resource is a resource specially used to store the data for calling an underlying network service such that the CSE updates original data in the first underlying network information resource to the data for calling an underlying network service, and sends the data for calling an underlying network service in the first underlying network information resource to an underlying network using a control plane.

The apparatus in this embodiment may be used to implement the technical solutions in the method embodiment shown in FIG. 5, FIG. 8, or FIG. 9, and implementation principles and technical effects of the apparatus are similar to those in the method embodiment and are not described herein again.

It should be noted that the schematic structural diagrams corresponding to the foregoing embodiments are only exemplary, and connection relationships between parts or modules are not limited to the forms shown in the figures, and may be subject to a situation in an actual application.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission processing method, comprising:
   receiving, by a common services entity (CSE), a first request message that is sent by an application function (AF) and used to instruct the CSE to update a first underlying network information resource, wherein the first request message comprises data for calling an underlying network service, and wherein the first underlying network information resource is a resource specially used to store the data for calling the underlying network service;
   updating, by the CSE, original data in the first underlying network information resource to the data for calling the underlying network service; and
   sending, by the CSE, the data for calling the underlying network service in the first underlying network information resource to an underlying network using a control plane.

2. The method according to claim 1, wherein before receiving, by the CSE, the first request message that is sent by the AF and used to instruct the CSE to update the first underlying network information resource, the method further comprises:
   receiving, by the CSE, a second request message sent by the AF, wherein the second request message is used to instruct the CSE to create the first underlying network information resource; and
   creating, by the CSE, the first underlying network information resource according to the second request message.

3. The method according to claim 1, wherein the first underlying network information resource is a newly-defined resource or a newly-defined child resource in a container resource.

4. The method according to claim 1, wherein sending, by the CSE, the data for calling the underlying network service in the first underlying network information resource to the underlying network using the control plane comprises:
   calling, by the CSE, a network services exposure (NSE) in the CSE to send the data for calling the underlying network service in the first underlying network information resource to the underlying network using the control plane; or
   calling, by the CSE, a delivery handler (DH) in the CSE to forward the data for calling the underlying network service in the first underlying network information resource to the NSE such that the NSE sends the data for calling the underlying network service to the underlying network using the control plane.

5. A data transmission processing method, comprising:
   storing, by an application function (AF), data for calling an underlying network service into a second underlying network information resource, and wherein the second underlying network information resource is a resource specially used to store the data for calling the underlying network service; and
   sending, by the AF to a common services entity (CSE), a first request message used to instruct the CSE to update a first underlying network information resource, wherein the first request message comprises the data for calling the underlying network service, and wherein the second underlying network information resource is the resource specially used to store the data for calling the underlying network service such that the CSE updates original data in the first underlying network information resource to the data for calling the underlying network service, and sends the data for calling the underlying network service in the first underlying network information resource to an underlying network using a control plane.

6. The method according to claim 5, wherein before storing, by the AF, data for calling the underlying network service to the second underlying network information resource, the method further comprises:
creating, by the AF, the second underlying network information resource; and
sending, by the AF, a second request message to the CSE, and wherein the second request information is used to instruct the CSE to create the first underlying network information resource.

7. The method according to claim 5, wherein the first underlying network information resource or the second underlying network information resource comprises any one of the following:
a newly-defined resource; or
a newly-defined child resource in a container resource.

8. A data transmission processing method, comprising:
receiving, by a common services entity (CSE), to-be-sent data and data type information of the to-be-sent data that are sent by an application function (AF), and wherein the data type information is used to indicate a type of the to-be-sent data;
determining, by the CSE according to the data type information, whether the to-be-sent data is data for calling an underlying network service; and
sending, by the CSE, the data for calling the underlying network service to an underlying network using a control plane when the to-be-sent data is data for calling the underlying network service.

9. The method according to claim 8, wherein sending, by the CSE, the data for calling the underlying network service to the underlying network using the control plane comprises calling, by the CSE, a network services exposure (NSE) in the CSE to send the data for calling the underlying network service to the underlying network using the control plane.

10. The method according to claim 8, wherein determining, by the CSE according to the data type information, whether the to-be-sent data is data for calling the underlying network service comprises:
calling, by the CSE, a delivery handler (DH) in the CSE to determine, according to the data type information, whether the to-be-sent data is data for calling the underlying network service; and
sending, by the CSE, the data for calling the underlying network service to the underlying network using the control plane comprises calling, by the CSE, the DH to forward the data for calling the underlying network service to a NSE in the CSE such that the NSE sends the data for calling the underlying network service to the underlying network using the control plane.

11. A data transmission processing apparatus, comprising:
a receiver configured to receive a first request message that is sent by an application function (AF) and used to instruct a common services entity (CSE) to update a first underlying network information resource, wherein the first request message comprises data for calling an underlying network service, and wherein the first underlying network information resource is a resource specially used to store the data for calling the underlying network service;
an updater coupled to the receiver and configured to update original data in the first underlying network information resource to the data for calling the underlying network service; and
a sender coupled to the updater and configured to send the data for calling the underlying network service in the first underlying network information resource to an underlying network using a control plane.

12. The apparatus according to claim 11, wherein the receiver is further configured to, before receiving the first request message that is sent by the AF and used to instruct the CSE to update the first underlying network information resource, receive a second request message sent by the AF, wherein the second request message is used to instruct the CSE to create the first underlying network information resource, and wherein the apparatus further comprises a creator configured to create the first underlying network information resource according to the second request message.

13. The apparatus according to claim 11, wherein the first underlying network information resource is a newly-defined resource or a newly-defined child resource in a container resource.

14. The apparatus according to claim 11, wherein the sender is further configured to:
call a network services exposure (NSE) in the apparatus to send the data for calling the underlying network service in the first underlying network information resource to the underlying network using the control plane; or
call a delivery handler (DH) in the CSE to forward the data for calling the underlying network service in the first underlying network information resource to the NSE such that the NSE sends the data for calling the underlying network service to the underlying network using the control plane.

15. A data transmission processing apparatus, comprising:
a processor configured to store data for calling an underlying network service into a second underlying network information resource, and wherein the second underlying network information resource is a resource specially used to store the data for calling the underlying network service; and
a sender configured to:
send, to a common services entity (CSE), a first request message used to instruct the CSE to update a first underlying network information resource, wherein the first request message comprises the data for calling the underlying network service, and wherein the second underlying network information resource is the resource specially used to store the data for calling the underlying network service such that the CSE updates original data in the first underlying network information resource to the data for calling the underlying network service; and
sends the data for calling the underlying network service in the first underlying network information resource to an underlying network using a control plane.

16. The apparatus according to claim 15, further comprising:
a creator configured to, before storing the data for calling the underlying network service into the second underlying network information resource, create the second underlying network information resource,
wherein the sender is further configured to send a second request message to the CSE, and wherein the second request information is used to instruct the CSE to create the first underlying network information resource.

17. The apparatus according to claim 15, wherein the first underlying network information resource or the second underlying network information resource comprises any one of the following:
   a newly-defined resource; or
   a newly-defined child resource in a container resource.

18. A data transmission processing apparatus, comprising:
   a receiver configured to receive to-be-sent data and data type information of the to-be-sent data that are sent by an application function (AF), wherein the data type information is used to indicate a type of the to-be-sent data;
   a determiner configured to determine, according to the data type information, whether the to-be-sent data is data for calling an underlying network service; and
   a sender configured to send the data for calling the underlying network service to an underlying network using a control plane when the determiner determines, according to the data type information, that the to-be-sent data is data for calling the underlying network service.

19. The apparatus according to claim 18, wherein the sender is further configured to call a network services exposure (NSE) in the apparatus to send the data for calling the underlying network service to the underlying network using the control plane.

20. The apparatus according to claim 18, wherein the determiner is further configured to call a delivery handler (DH) in the apparatus to determine, according to the data type information, whether the to-be-sent data is data for calling the underlying network service, and wherein the sender is further configured to call the DH to forward the data for calling the underlying network service to a NSE in a common services entity (CSE) such that the NSE sends the data for calling the underlying network service to the underlying network using the control plane.

21. A data transmission processing apparatus, comprising:
   a receiver configured to:
      receive a first request message that is sent by an application function (AF); and used to instruct a common services entity (CSE) to update a first underlying network information resource, wherein the first request message comprises data for calling an underlying network service, and wherein the first underlying network information resource is a resource specially used to store the data for calling the underlying network service;
   a processor coupled to the receiver and configured to update original data in the first underlying network information resource to the data for calling the underlying network service; and
   a transmitter coupled to the processor and configured to send the data for calling the underlying network service in the first underlying network information resource to an underlying network using a control plane.

22. The apparatus according to claim 21, wherein the receiver is further configured to, before receiving the first request message that is sent by the AF and used to instruct the CSE to update the first underlying network information resource, receive a second request message sent by the AF module, wherein the second request message is used to instruct the CSE to create the first underlying network information resource, and wherein the processor is further configured to create the first underlying network information resource according to the second request message.

23. The apparatus according to claim 21, wherein the first underlying network information resource is a newly-defined resource or a newly-defined child resource in a container resource.

24. The apparatus according to claim 21, wherein the transmitter is further configured to:
   call a network services exposure (NSE) in the apparatus to send the data for calling the underlying network service in the first underlying network information resource to the underlying network using the control plane; or
   call a delivery handler (DH) in the CSE to forward the data for calling the underlying network service in the first underlying network information resource to the NSE such that the NSE sends the data for calling the underlying network service to the underlying network using the control plane.

25. A data transmission processing apparatus, comprising:
   a processor configured to store data for calling an underlying network service into a second underlying network information resource, and wherein the second underlying network information resource is a resource specially used to store the data for calling the underlying network service; and
   a transmitter coupled to the processor and configured to send, to a common services entity (CSE), a first request message used to instruct the CSE to update a first underlying network information resource, wherein the first request message comprises the data for calling the underlying network service, and wherein the second underlying network information resource is the resource specially used to store the data for calling the underlying network service such that the CSE updates original data in the first underlying network information resource to the data for calling an underlying network service, and sends the data for calling the underlying network service in the first underlying network information resource to an underlying network using a control plane.

26. The apparatus according to claim 25, wherein the processor is further configured to, before storing the data for calling the underlying network service into the second underlying network information resource, create the second underlying network information resource, wherein the transmitter is further configured to send a second request message to the CSE, and wherein the second request information is used to instruct the CSE to create the first underlying network information resource.

27. The apparatus according to claim 25, wherein the first underlying network information resource or the second underlying network information resource comprises any one of the following:
   a newly-defined resource; or
   a newly-defined child resource in a container resource.

28. A data transmission processing apparatus, comprising:
   a receiver configured to receive to-be-sent data and data type information of the to-be-sent data that are sent by an application function (AF), wherein the data type information is used to indicate a type of the to-be-sent data;
   a processor coupled to the receiver and configured to determine, according to the data type information, whether the to-be-sent data is data for calling an underlying network service; and
   a transmitter coupled to the processor and configured to send the data for calling the underlying network service to an underlying network using a control plane when the processor determines, according to the data type information, that the to-be-sent data is data for calling the underlying network service.

29. The apparatus according to claim 28, wherein the transmitter is further configured to call a network services exposure (NSE) in the apparatus to send the data for calling the underlying network service to the underlying network using the control plane.

30. The apparatus according to claim 28, wherein the processor is further configured to call a delivery handler (DH) in the apparatus to determine, according to the data type information, whether the to-be-sent data is data for calling the underlying network service, and wherein the transmitter is further configured to call the DH to forward the data for calling the underlying network service to a network services exposure (NSE) in a common services entity (CSE) such that the NSE sends the data for calling the underlying network service to the underlying network using the control plane.

* * * * *